UNITED STATES PATENT OFFICE.

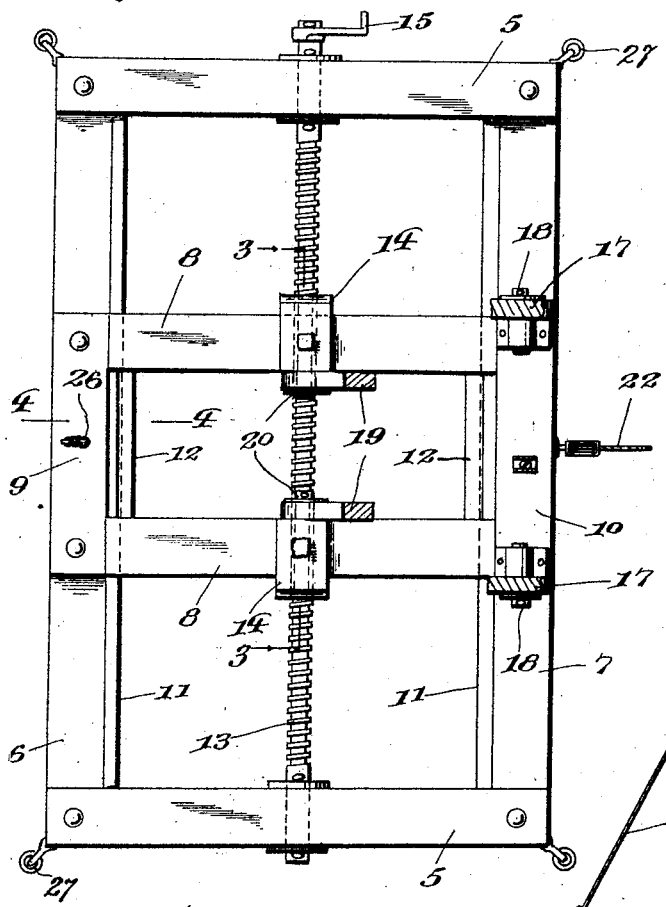
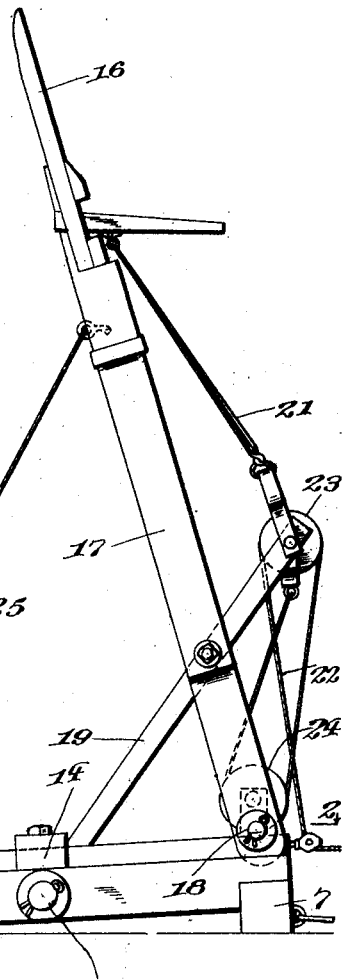
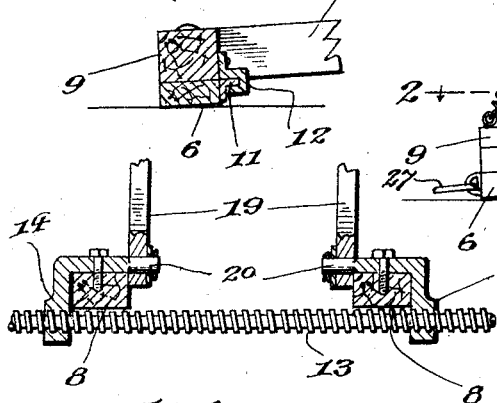

GEORGE S. BEEMER, OF MEEKER, COLORADO.

HAYSTACKER.

1,405,659.  Specification of Letters Patent.  Patented Feb. 7, 1922.

Application filed February 17, 1921. Serial No. 445,585.

*To all whom it may concern:*

Be it known that I, GEORGE S. BEEMER, a citizen of the United States, residing at Meeker, in the county of Rio Blanco and State of Colorado, have invented certain new and useful Improvements in Haystackers, of which the following is a specification.

This invention relates to apparatus for piling hay in stacks, and more particularly to apparatus of this kind where the load-supporting member is a vertically swinging fork.

The invention has for its object to provide the apparatus with a load-supporting member which can be moved bodily in a horizontal direction for the purpose of enabling the hay to be placed on the stack in different places from one end to the other, but always in the center where it should be in order to keep the stack highest at the center so that it will shed water.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of the apparatus with the fork in elevated position; Fig. 2 is a horizontal section on the line 2—2 of Fig. 1, and Figs. 3 and 4 are cross-sections on the lines 3—3 and 4—4, respectively, of Fig. 2.

Referring specifically to the drawing the base of the apparatus is a rectangular frame adapted to seat on the ground, and composed of side beams 5 which are connected in laterally spaced relation by front and rear cross beams 6 and 7. This frame supports a slidable carriage composed of side beams 8 connected in spaced relation by front and rear cross beams 9 and 10. The carriage cross beams slidably seat on the cross beams of the base, and hence the carriage is movable back and forth horizontally between the side beams of the base. On the inner edges of the base cross beams are rails 11 which are slidably engageable at the bottom by retaining shoes 12 carried by the carriage cross beams.

The carriage is operated by a feed screw or worm 13 journaled in suitable bearings on the side beams 5 of the base, and threaded through nuts 14 carried by the side beams 8 of the carriage. One end of the feed screw is fitted with a crank handle or other suitable operating means 15. It will be evident that the carriage is made to travel in the direction of the length of the feed screw when the latter is rotated, and the carriage can thus be moved horizontally in either direction between the base side beams 5.

The load-supporting member of the apparatus is a fork 16 carried at the outer end of a pair of supporting arms 17 which are pivoted at their inner ends, as shown at 18, to the rear cross beam 10 of the carriage. The carriage therefore supports the fork, and consequently the latter is bodily movable in a horizontal direction along the stack to deposit the hay at any place between the ends thereof.

The load-supporting member swings vertically as usual to elevate the hay, this operation being effected by a vertically swinging frame 19 pivoted at one end to the carriage side beams 8 as shown at 20, and having at its other end a connection 21 with the fork arms 17. The frame 19 is operated by a hauling line 22 passing over a pulley 23 carried by the outer end thereof, and over a pulley 24 on the rear cross bar 10 of the carriage. A check rope 25 for the fork is also provided, the same being connected by a spring 26 to the front cross bar 9 of the carriage. The means for operating the fork to swing the same vertically are therefore all carried by the carriage and move with latter when it is shifted as hereinbefore described.

The preferred embodiment of the invention has been illustrated and described, but it will be understood that many changes in the structural details may be made without a departure from the spirit and scope of the invention as claimed hereinafter. The corners of the base frame may be fitted with rings 27 for fastening the same to the ground by stakes or pins.

I claim:

1. A hay stacker comprising a base, a carriage slidably mounted on the base for travel in a horizontal direction, a vertically swinging hay fork supported by the carriage, operating means for the fork on the carriage, and means for operating the carriage for moving the fork bodily in a horizontal direction.

2. A hay stacker comprising a base, a carriage slidably mounted on the base for travel in a horizontal direction, a vertically swinging hay fork supported by the carriage, operating means for the fork on the carriage, a feed screw on the base, and a nut on the carriage through which the feed screw is threaded.

In testimony whereof I affix my signature.

GEORGE S. BEEMER.